Oct. 19, 1965 KUNIO ATSUMI 3,212,348
KICK STARTING DEVICE FOR A MOTOR CYCLE
Filed March 3, 1964 2 Sheets-Sheet 1

INVENTOR
KUNIO ATSUMI
BY E. M. Squire
his ATTORNEY

Oct. 19, 1965　　　　KUNIO ATSUMI　　　3,212,348
KICK STARTING DEVICE FOR A MOTOR CYCLE
Filed March 3, 1964　　　　　　　　　　　　2 Sheets-Sheet 2

INVENTOR
KUNIO ATSUMI

BY E. M. Squire his ATTORNEY

United States Patent Office 3,212,348
Patented Oct. 19, 1965

3,212,348
KICK STARTING DEVICE FOR A MOTOR CYCLE
Kunio Atsumi, Shizuoka-ken, Japan, assignor to Suzuki Motor Co., Ltd., Hamana-gun, Shizuoka-ken, Japan, a corporation of Japan
Filed Mar. 3, 1964, Ser. No. 349,079
Claims priority, application Japan, Mar. 13, 1963, 38/18,295
3 Claims. (Cl. 74—142)

The present invention relates to a kick starting device for a motor cycle.

A transmission mechanism of a motor cycle from an engine generally transmits power from a crank shaft through a counter shaft in parallel with the crank shaft to a drive shaft similarly in parallel with the crank shaft and the drive shaft is connected to drive a rear wheel through a sprocket fixed to the end of the drive shaft. The crank shaft and the counter shaft are provided with gears mounted thereon respectively and being in mesh. One gear is fixed on the shaft. Between the other gear and a shaft suporting it there is provided a clutch. Therefore the clutch is provided on the end of the crank shaft or the counter shaft. Between the counter shaft and the drive shaft there are provided pairs of gears of various speed ratios, speed being changed by selecting a particular pair of said gears. A neutral position is provided for interrupting the transmission between the counter and drive shafts. Although a starting motor can be mounted on the crank shaft as a starter, it is difficult to mount a kick starter on the crank shaft and it is therefore usual to provide it on the counter shaft.

When said clutch is a centrifugal automatic clutch actuated in response to the rotational velocity of a crank shaft, since the clutch is released when the engine stops, a reverse torque transmission device must be provided to clutch separately, otherwise a starter rotating the counter shaft cannot be used.

In a conventional kick device for driving a counter shaft, it was naturally required to operate a speed change device at the neutral position in which power is not transmitted to the drive shaft. In an emergency, for instance, if the engine stops while the motor cycle is temporarily stopped and then started again (low speed gears are engaging), it is usual for a conventional device to return the speed change device to its neutral position prior to starting.

It is a principal object of the present invention to provide a kick starting device wherein the kick starting may be effected independently of the change speed transmission.

Figure 1:
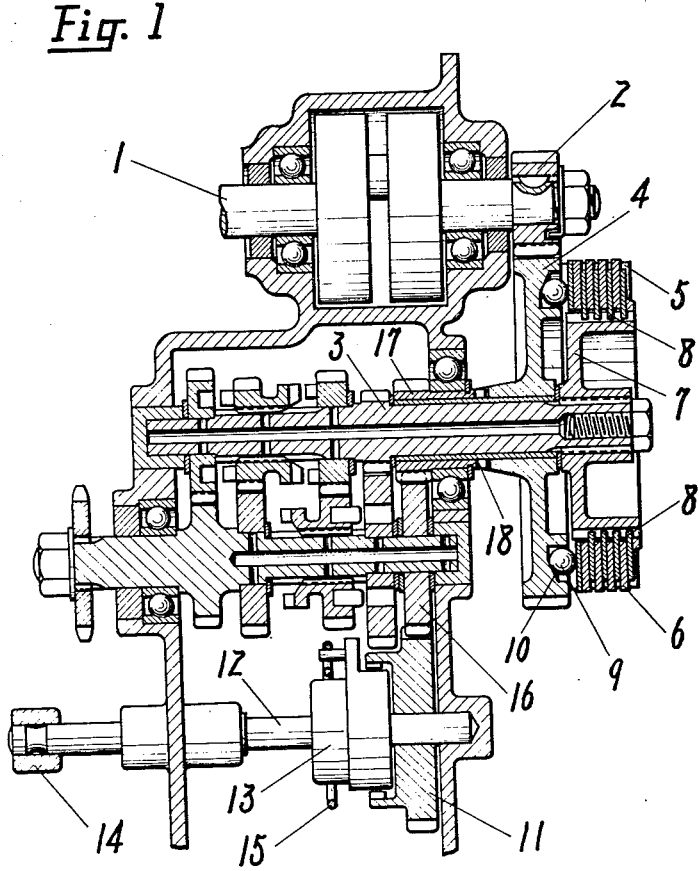
Figure 2:
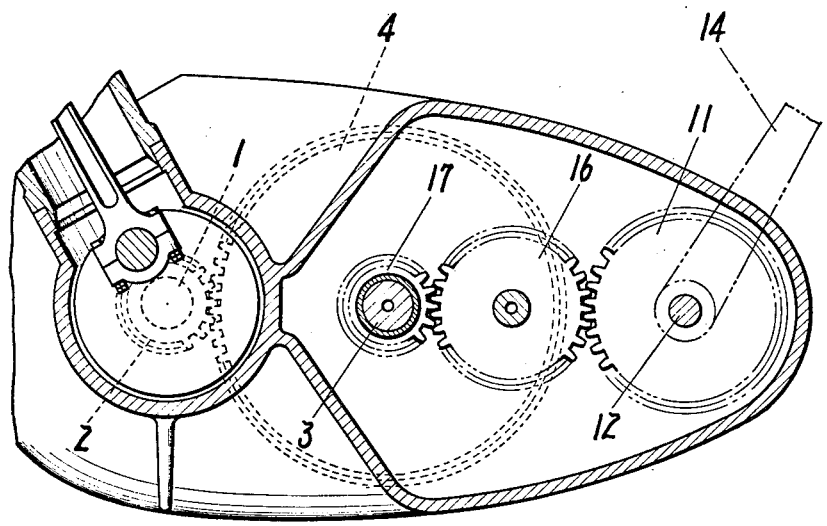

Other objects and advantages of the present invention will be apparent from the following description with reference to the accompanying drawings, in which:

FIGURE 1 is a sectional top plan view of a kick starting device according to the present invention, and FIGURE 2 is a sectional front view thereof.

In the drawings, 1 is a crank shaft of a motor cycle engine, 2 a pinion fixed on one end of the crank shaft, 3 a counter shaft in parallel with the crank shaft 1, on one end of which is rotatably mounted a drive gear 4 engaging with said pinion. On the drive gear 4 is fixed a clutch housing 5 holding driving friction discs 6. Driven friction discs 8 are arranged alternately with driving friction discs 6 and are carried by a hub 7 fixed to the counter shaft 3. If both sets of friction discs 6 and 8 are forced together, torque from the drive gear 4 is transmitted to the counter shaft 3. 9 is one of a series of centrifugal balls retained by on the drive gear 4 and which is in contact with an inclined face 10 directed radially outwardly toward the friction discs 6 and 8. Each ball 9 also engages an end one of the driven friction discs 8. As the angular velocity of the drive gear 4 increases, the balls 9 are urged radially outwardly by centrifugal force and the inclined face 10 causes the driving and driven discs 6 and 8, respectively, to be pressed together and frictionally coupled so that the counter shaft 3 is driven by the crank shaft 1.

11 is a kick gear freely rotatably mounted on a kick shaft 12 and connected thereto through an overrunning clutch 13. 14 is a kick pedal and 15 a retractile spring. 16 is an idler gear meshing with the kick gear 11 and with a gear 17 connected to the drive gear 4 by means of coupling sleeve 18. Thus, torque can be transmitted directly to the crank shaft 1 by rotation of the kick shaft 12.

Actuation of the kick pedal 14 rotate the kick shaft 12, the kick gear 11 rotates in response to the rotation of the kick shaft in the starting direction and clauses rotation of the crank shaft 1 through the gears 16, 17 and the drive gear 4. By this operation the engine starts, but the kick shaft 12 is effectively disconnected by the over-running clutch 12 and pedal 14 is returned to its initial position by the retractile spring 15. During this operation, the centrifugal force acting on balls 9 is not sufficient to engage the clutch discs 6 and 8 so that the drive gear 4 does not transmit power to the counter shaft 3. Accordingly, the gear ratio established by the transmission gears between the counter shaft 3 and the drive shaft is immaterial. The engine may be re-started at any time without placing the gear shift in neutral.

What I claim is:

1. Kick starter mechanism for starting a unidirectionally operative internal combustion engine having a crankshaft, said mechanism comprising: a first gear fast on said crankshaft; a counter shaft spaced from and parallel to said crankshaft; transmission means driven by said counter shaft and arranged to drive an output shaft from said counter shaft at a preselected speed ratio; a second gear free on said counter shaft, said second gear being in continuous meshing engagement with said first gear; speed responsive clutch means on said counter shaft, said clutch means connecting said second gear to drive said counter shaft at all times when the angular velocity of said second gear exceeds a predetermined minimum velocity; a kick shaft; gearing continuously connected to drive said second gear, said gearing including a third gear free on said kick shaft; a kick pedal member fast on said kick shaft; and unidirectionally operative coupling means connecting said kick shaft to drive said third gear through a limited angular displacement in response to each actuation of said kick member, said third gear driving said second gear at an angular velocity less than said minimum velocity.

2. Starter mechanism according to claim 1, further comprising retractile spring means yieldingly urging said kick member toward a predetermined initial position.

3. Starter mechanism according to claim 1, wherein said unidirectionally operative coupling means is an overrunning clutch.

References Cited by the Examiner
UNITED STATES PATENTS
2,679,166   5/54   Kreis _____ 74—336

BROUGHTON G. DURHAM, *Primary Examiner.*